US012599793B2

(12) United States Patent
Shin

(10) Patent No.: US 12,599,793 B2
(45) Date of Patent: Apr. 14, 2026

(54) COOPERATIVE FIRE EXTINGUISHING SYSTEM FOR VEHICLE

(71) Applicants: HYUNDAI MOTOR COMPANY, Seoul (KR); KIA CORPORATION, Seoul (KR)

(72) Inventor: Hyeon Gi Shin, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 296 days.

(21) Appl. No.: 18/214,092

(22) Filed: Jun. 26, 2023

(65) Prior Publication Data

US 2024/0189637 A1 Jun. 13, 2024

(30) Foreign Application Priority Data

Dec. 13, 2022 (KR) ........................ 10-2022-0173380

(51) Int. Cl.
*A62C 3/07* (2006.01)
*A62C 27/00* (2006.01)

(52) U.S. Cl.
CPC ................ *A62C 3/07* (2013.01); *A62C 27/00* (2013.01)

(58) Field of Classification Search
CPC ......... A62C 27/00; A62C 3/07; A62C 3/0292; A62C 3/16; A62C 37/38; A62C 35/02; A62C 35/13; A62C 99/0072; A62C 99/0009
See application file for complete search history.

(56) References Cited

U.S. PATENT DOCUMENTS

2021/0216072 A1* 7/2021 Lacaze ...................... B62D 6/00
2022/0016457 A1* 1/2022 Sjödin ..................... A62C 35/68
2022/0040514 A1* 2/2022 Claesson ................. F04B 49/22

FOREIGN PATENT DOCUMENTS

WO WO-2022251928 A2 * 12/2022 ............ A62C 27/00

* cited by examiner

*Primary Examiner* — Christopher R Dandridge
(74) *Attorney, Agent, or Firm* — Morgan Lewis & Bockius LLP

(57) ABSTRACT

A fire extinguishing system includes a fire detector configured to detect a fire in a vehicle, a controller of the vehicle on fire to transmit fire occurrence information including a fire extinguishment request signal and vehicle location information to a surrounding vehicle and to perform a control process for fire extinguishment when determining a fire has occurred through the fire detector, a controller of the surrounding vehicle configured to receive the fire occurrence information from the vehicle on fire, to transmit a signal showing whether to participate in fire extinguishment determined by a driver to the vehicle on fire, and to perform cooperative control for supplying fire extinguishing water of the surrounding vehicle to the vehicle on fire together with the controller of the vehicle on fire, and a tank mounted in the surrounding vehicle and storing the fire extinguishing water which is supplied to the vehicle on fire.

20 Claims, 7 Drawing Sheets

COOPERATIVE FIRE EXTINGUISHING SYSTEM FOR VEHICLE

CROSS REFERENCE TO RELATED APPLICATION

The present application claims priority to Korean Patent Application No. 10-2022-0173380, filed Dec. 13, 2022, the entire contents of which is incorporated herein for all purposes by this reference.

BACKGROUND OF THE PRESENT DISCLOSURE

Field of the Present Disclosure

The present disclosure relates to a cooperative fire extinguishing system for a vehicle, and more particularly, to a fire extinguishing system that can rapidly and effectively extinguish a fire occurring in an eco-friendly vehicle through cooperation of vehicles.

DESCRIPTION OF RELATED ART

In general, because not only many heat sources exist, but also various electric wires are complexly provided in vehicles, a possibility of a fire always exists in vehicles. A fire may occur at tires, etc. that generate heat due to friction in addition to electric parts in a vehicle.

Recently, as eco-friendly vehicles such as an electric vehicle or a fuel cell vehicle are becoming popularized, the possibility of a fire at a battery or high-voltage electric wires in such vehicles due to external shock, an internal short circuit, or the like is increasing.

Eco-friendly vehicles (xEVs) all have something in common in that they are all driven by driving a motor using power stored in a battery, and all thereof may be considered as electric vehicles in a broad sense. Such electric vehicles are provided with a high-voltage battery pack that supplies power to a motor and the high-voltage battery pack supplies power to the power electronic system including a motor while being repeatedly charged and discharged while the vehicles are driven.

The battery pack of electric vehicles generally includes a battery case, a battery module disposed in the battery case, a Battery Management System (BMS) that detects the voltage, current, temperature, etc. of cells constituting the battery module and controls operation of the cells, etc.

Furthermore, the battery pack includes a configuration that prevents a fire by cutting a fuse or disconnecting a relay connected to an inverter when an internal short circuit is generated or an overcurrent flows in the battery pack.

However, a fire may occur at the battery pack or electric wires in an electric vehicle due to various reasons such a collision and malfunction of parts while the electric vehicle is driven. Unless such a fire in a vehicle is extinguished well, the fire may cause total destruction of the vehicle, which may result in a large physical and human loss.

A fire of a battery may rapidly spread due to structures and substances inside and outside the battery and public transportation vehicles such as a bus carries many passengers, so it is necessary to rapidly cope with a fire for the safety of passengers, and when the first response fails, it may result in a catastrophe.

Nevertheless, preparing and using a fire extinguisher is the best present method that can cope with a fire in a vehicle. In the instant case, similarly, when a driver does not use a fire extinguisher at the right time, first extinguishing fails, such that the fire may spread throughout the vehicle and the possibility of human costs increases. Even though a driver or a passenger rapidly recognizes a fire in a vehicle, it is difficult to extinguish the fire using only a small fire extinguisher prepared in the vehicle.

When there is a fire hydrant around a vehicle or there is a fire truck around a fire site, it is possible to extinguish the fire by sprinkling fire extinguishing water on the vehicle, but if not so, it is difficult to extinguish the fire at the earl stage.

Recently, as more eco-friendly vehicles (xEV) that are provided with a high-voltage battery, have a high possibility of a fire at a battery or a high electric system, and make first extinguishing difficult are used, there is a high demand for a method that can more rapidly and effective extinguish a fire at the early stage when a fire occurs while driving.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a fire extinguishing system that can rapidly and effective extinguish a fire occurring in an eco-friendly vehicle at the early stage through cooperation of vehicles.

The objectives of the present disclosure are not limited to those described above and other objectives not stated herein would be apparently understood by those who have ordinary skills in the art that the present disclosure belongs to (hereafter, "those skilled in the art") from the following description.

To achieve the objectives, according to an exemplary embodiment of the present disclosure, there is provided a cooperative fire extinguishing system for a vehicle, the cooperative fire extinguishing system including: a fire detector configured to detect a fire in the vehicle: a controller of the vehicle on fire to transmit fire occurrence information including a fire extinguishment request signal and vehicle location information to a surrounding vehicle and to perform a control process for fire extinguishment upon concluding that the fire has occurred through the fire detector: a controller of the surrounding vehicle configured to receive the fire occurrence information from the vehicle on fire, to transmit a signal showing whether to participate in fire extinguishment determined by a driver to the vehicle on fire, and to perform cooperative control for supplying fire extinguishing water of the surrounding vehicle to the vehicle on fire together with the controller of the vehicle on fire: and a tank mounted in the surrounding vehicle and storing the fire extinguishing water which is supplied to the vehicle on fire.

In an exemplary embodiment of the present disclosure, the cooperative fire extinguishing system for a vehicle may further include a pump mounted in the surrounding vehicle and configured to draw and send the fire extinguishing water stored in the tank to the vehicle on fire through a supply pipe so that the fire extinguishing water may be supplied to the vehicle on fire.

Furthermore, in an exemplary embodiment of the present disclosure, the surrounding vehicle may be an autonomous vehicle and may be provided with: an autonomous driving sensor configured to obtain information for autonomous driving control: and an autonomous driving controller configured to control autonomous driving based on the information obtained by the autonomous driving sensor, and the autonomous driving controller may be configured to perform autonomous driving control to move the surrounding vehicle to a docking position, at which a supply pipe of the surrounding vehicle connected to the tank to supply fire extinguishing water may be connected to an injection pipe of the vehicle on fire, based on the information obtained by the autonomous driving sensor.

Furthermore, in an exemplary embodiment of the present disclosure, the controller of the vehicle on fire may be configured to transmit the fire occurrence information including a fire occurrence signal and location information of the vehicle on fire to a fire station through a communication device of the vehicle on fire so that a fire truck may be dispatched from the fire station.

Furthermore, in an exemplary embodiment of the present disclosure, the autonomous driving controller may be configured to request a vehicle kind of the vehicle on fire and docking position information from the vehicle on fire, and to perform autonomous driving control to move the surrounding vehicle to the docking position based on the vehicle kind and the docking position information received from the controller of the vehicle on fire when the surrounding vehicle reaches a location of the vehicle on fire in an autonomous driving mode of the surrounding vehicle.

The docking position information may include position information of a docking connector of the vehicle on fire to which a supply pipe of the surrounding vehicle is connected.

Furthermore, in an exemplary embodiment of the present disclosure, the cooperative fire extinguishing system for a vehicle may further include a docking connector which is disposed in the vehicle on fire and to which the supply pipe of the surrounding vehicle configured to supply the fire extinguishing water stored in the tank is connected to be able to supply the fire extinguishing water for fire extinguishment.

Furthermore, in an exemplary embodiment of the present disclosure, the surrounding vehicle may be a fuel cell vehicle, and the tank mounted in the surrounding vehicle may be a tank configured to store discharge water produced and discharged from a fuel cell stack.

Furthermore, the controller of the vehicle on fire may be configured to transmit the fire occurrence information to all of surrounding vehicles located within a predetermined radius distance from the vehicle on fire though a communication device of the vehicle on fire.

Furthermore, the controller of the vehicle on fire may be configured to transmit the fire occurrence information including a fire occurrence signal and location information of the vehicle on fire to a fire station through the communication device of the vehicle on fire so that a fire truck may be dispatched from the fire station.

Furthermore, the controller of the vehicle on fire may be configured to determine a radius distance to the fire station from the location of the vehicle on fire and a travel time that the fire truck takes to reach the location of the vehicle on fire from the fire station, using navigation information including map information and real-time traffic information, and may be set not to transmit the fire occurrence information to the surrounding vehicles when the radius distance to the fire station is within a predetermined radius distance from the location of the vehicle on fire and the travel time is within a predetermined time.

Furthermore, the controller of the vehicle on fire may be configured to receive a location of the fire truck turned out from the fire station through a communication device of the vehicle on fire, and to request surrounding vehicles that reached the location of the vehicle on fire for firing extinguishment to move to other places until a predetermined time before the turning-out fire truck reaches the location of the vehicle on fire.

Furthermore, in an exemplary embodiment of the present disclosure, the cooperative fire extinguishing system for a vehicle may further include an input device mounted in the surrounding vehicle and configured to be able to input whether to participate in fire extinguishment to the controller of the surrounding vehicle in response that a driver selects whether to participate in fire extinguishment.

Furthermore, in an exemplary embodiment of the present disclosure, the cooperative fire extinguishing system for a vehicle may further include a display mounted in the surrounding vehicle and controlled by the controller of the surrounding vehicle to display location information of the vehicle on fire, a travel time of the surrounding vehicle, which is taken to reach the location of the vehicle on fire, and information for asking whether to participate in fire extinguishment.

Furthermore, in an exemplary embodiment of the present disclosure, in response that a driver selects and inputs participation in fire extinguishment through the input device, the controller of the surrounding vehicle may transmit a fire extinguishment participation signal showing intention of participating in fire extinguishment of the driver to the vehicle on fire through a communication device of the surrounding vehicle, and when receiving the fire extinguishment participation signal through the communication device of the vehicle on fire, the controller of the vehicle on fire may select the vehicle that transmitted the received fire extinguishment participation signal as a fire extinguishing vehicle, and may perform cooperative control for fire extinguishment together with the controller of the surrounding vehicle selected as the fire extinguishing vehicle.

Furthermore, in an exemplary embodiment of the present disclosure, the controller of the vehicle on fire may be configured to transmit the fire occurrence information to all of surrounding vehicles located within a predetermined radius distance from the vehicle on fire through the communication device of the vehicle on fire, and to select only a setting number of surrounding vehicles of the surrounding vehicles that transmitted the fire extinguishment participation signal as fire extinguishing vehicles in order of arrival of the fire extinguishment participation signal.

Furthermore, in an exemplary embodiment of the present disclosure, controllers of the selected fire extinguishing vehicles and the controller of the vehicle on fire may be configured to perform cooperative control for connecting the selected fire extinguishing vehicles to be able to supply fire extinguishing water to the vehicle on fire in a predetermined order and for separating and moving a connected fire extinguishing vehicle from the vehicle on fire when the connected fire extinguishing vehicle supplied all fire extinguishing water in a tank.

Furthermore, in an exemplary embodiment of the present disclosure, the cooperative fire extinguishing system for a vehicle may further include a compensation system configured to perform economical compensation to drivers of surrounding vehicles that participated in the fire extinguishment for the vehicle on fire, wherein the compensation system may include a server of a service provider configured to provide a compensation service to the drivers of the surrounding vehicles that participated in fire extinguishment, and the server of the service provider may be configured to provide a compensation service that provides at least one or more of a point, a coupon, and cash to the drivers of the surrounding vehicles that participated in fire extinguishment.

Furthermore, in an exemplary embodiment of the present disclosure, the cooperative fire extinguishing system for a vehicle may further include a compensation system configured to perform economical compensation to drivers of surrounding vehicles that participated in the fire extinguishment for the vehicle on fire, wherein the compensation system may include: a server of a service provider configured to provide a compensation service to drivers of surrounding vehicles that participated in fire extinguishment: and a server of an insurance company connected to the server of the service provider so that communication is possible, and having insurance that the drivers of the surrounding vehicles subscribed, and the server of the service provider and the server of the insurance company may be configured to provide a compensation service that gives benefit of a discount of a premium to the drivers of the surrounding vehicles that participated in fire extinguishment.

Furthermore, the fire is the vehicle is a fire that has occurred in an internal space of a battery case of a battery pack mounted in the vehicle on fire, and the battery case may include a structure sealing a battery module including battery cells so that the internal space in which the battery module is positioned may be filled with fire extinguishing water supplied from the surrounding vehicle and injected through an injection pipe of the vehicle on fire.

According to the cooperative fire extinguishing system for a vehicle, there is an effect that it is possible to more rapidly and effectively extinguish a fire that has occurred in an eco-friendly vehicle through cooperation of vehicles.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
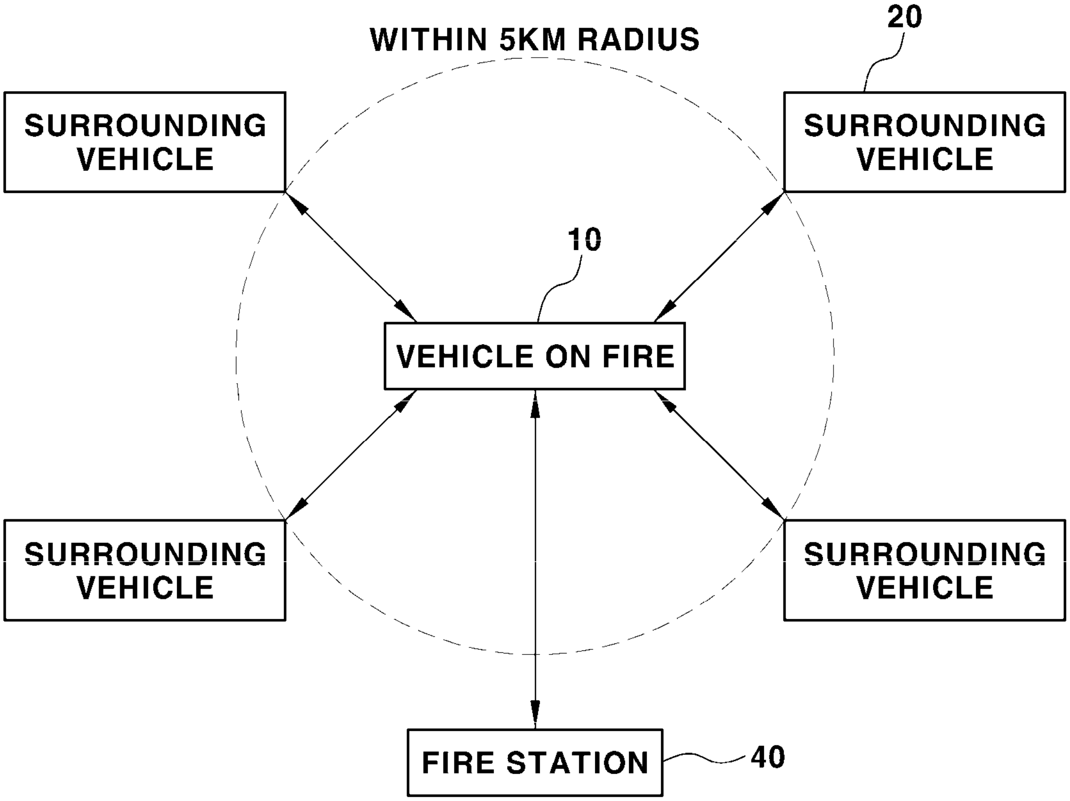
FIG. 1 is a diagram showing a vehicle on fire and surrounding vehicles that perform the cooperative fire extinguishing process according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Embodiments of the present disclosure will be described hereafter in detail with reference to the accompanying drawings. Description of specific structures and functions included in embodiments of the present disclosure is only an example for describing the exemplary embodiments according to the concept of the present disclosure and the exemplary embodiments according to the concept of the present disclosure may be implemented in various ways. The present disclosure is not limited to the exemplary embodiments described herein and should be construed as including all changes, equivalents, and replacements that are included in the spirit and the range of the present disclosure.

It will be understood that, although the terms first and/or second, etc. may be used herein to describe various elements, these elements should not be limited by these terms. These terms are used only to distinguish one element from another element. For instance, a first element discussed below could be termed a second element without departing from the right range of the present disclosure. Similarly, the second element could also be termed the first element.

It is to be understood that when one element is referred to as being “connected to” or “coupled to” another element, it may be directly connected to or directly coupled to another element or be connected to or coupled to another element, including the other element intervening therebetween. On the other hand, it is to be understood that when one element is referred to as being “directly connected to” or “directly coupled to” another element, it may be connected to or coupled to another element without the other element intervening therebetween. Furthermore, the terms used herein to describe a relationship between elements, that is, “between”, “directly between”, “adjacent”, or “directly adjacent” should be interpreted in the same manner as those described above.

Like reference numerals indicate the same components throughout the specification. The terms used herein are provided to describe embodiments without limiting the present disclosure. In the specification, a singular form includes a plural form unless specifically stated in the sentences. The terms “comprise” and/or “comprising” used herein do not exclude that another component, step, operation, and/or element exist or are added in the stated component, step, operation, and/or element.

The present disclosure relates to a fire extinguishing system that can extinguish a fire occurring in a vehicle. The present disclosure provides a cooperative fire extinguishing system that can rapidly and effectively extinguish a fire occurring in a vehicle at the early stage through cooperation of vehicles.

Figure 2:
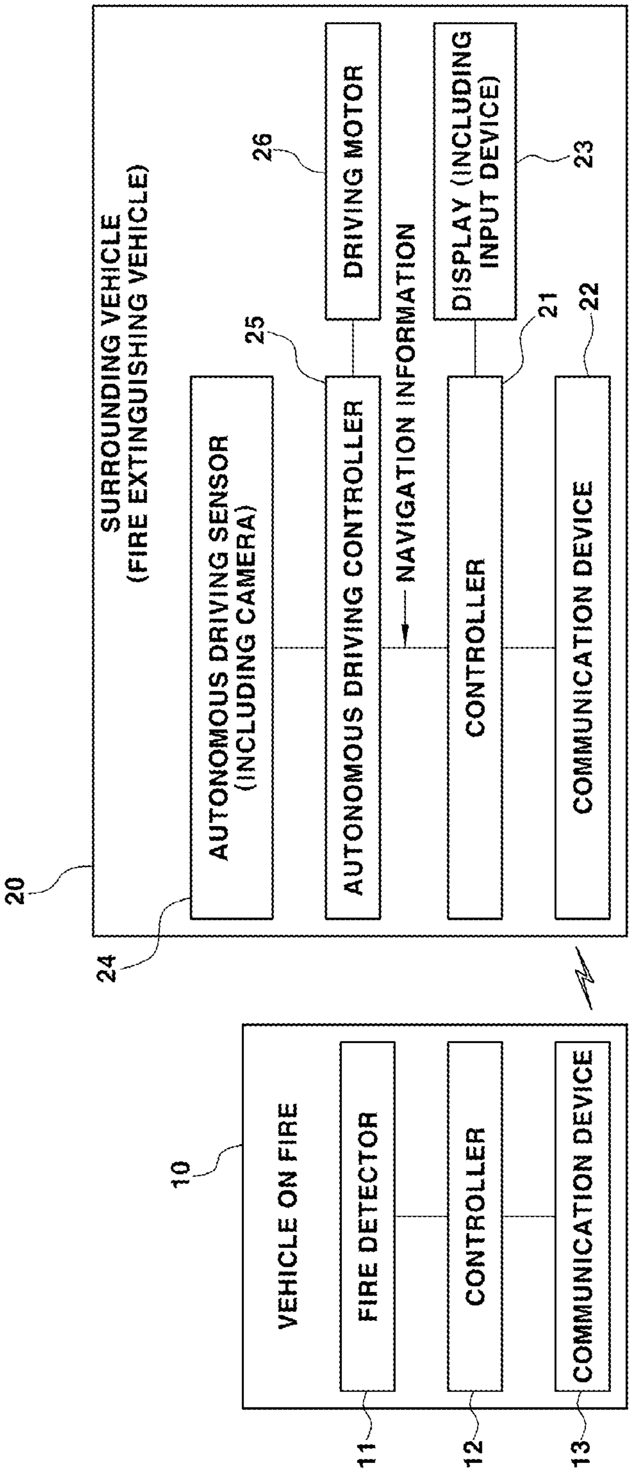
FIG. 2 is a block diagram showing the main configuration, which is mounted in a vehicle on fire and a fire extinguishing vehicle, in the cooperative fire extinguishing system according to an exemplary embodiment of the present disclosure.

FIG. 1 is a diagram showing a vehicle on fire 10 and surrounding vehicles 20 that perform the cooperative fire extinguishing process according to an exemplary embodiment of the present disclosure and FIG. 2 is a block diagram showing the main configuration, which is mounted in a vehicle on fire 10 and a fire extinguishing vehicle 20, in the cooperative fire extinguishing system according to an exemplary embodiment of the present disclosure. In the following description, a vehicle in which a fire occurs and that becomes an object of fire extinguishing is referred to as a “vehicle on fire”.

The fire extinguishing system according to an exemplary embodiment of the present disclosure may be a system for extinguishing a fire occurring in eco-friendly vehicles. The fire extinguishing system according to an exemplary embodiment of the present disclosure is configured so that one of surrounding vehicles 20 is docked to a vehicle on fire 10 and then the system can extinguish a fire in the vehicle on fire using fire extinguishing water which is supplied from the docked surrounding vehicle. In the present configuration, a plurality of vehicles can extinguish the fire in the vehicle on fire in cooperation.

The vehicle on fire 10 may be an eco-friendly vehicle, for example, an electric vehicle or a fuel cell vehicle provided with a high-voltage battery. That is, the present disclosure may be used to extinguish a fire occurring in an electric vehicle or a fuel cell vehicle, and a vehicle fire in the instant case may be a fire occurring at a battery.

The vehicle 20 that can participate in fire extinguishment in an exemplary embodiment of the present disclosure is a vehicle which may be docked to a vehicle on fire 10 and can supply fire extinguishing water stored in a tank 35. The vehicle 20 that can participate in fire extinguishment in an exemplary embodiment of the present disclosure is a vehicle that can communicate with a vehicle on fire or an external system and can extinguish a fire in cooperation while transmitting and receiving necessary information through communication.

For example, the vehicle 20 that can participate in fire extinguishment in an exemplary embodiment of the present disclosure is a vehicle may be a fuel cell vehicle that can store discharge water produced in and discharged from a fuel cell stack (reference number “35” in FIG. 3) in a tank and can supply the discharge water as fire extinguishing water. The vehicle 20 that can participate in fire extinguishment in an exemplary embodiment of the present disclosure may be an autonomous vehicle that can supply fire extinguishing water stored in a tank and can autonomously drive.

The fire extinguishing system according to an exemplary embodiment of the present disclosure, which is mounted in a vehicle on fire 10, includes: a fire detector 11 provided in the vehicle 10 to detect a fire occurring in the vehicle: a controller 12 mounted in the vehicle 10 and performing a control process for extinguishing a fire by entering a fire extinguishment mode when determining that a fire has occurred in the vehicle through the fire detector 11: a communication device 13 mounted in the vehicle 10 to communicate with external systems such as a surrounding vehicle 20, the server of a fire station, etc.

In an exemplary embodiment of the present disclosure, the first detector may be a temperature sensor which is configured to detect a temperature (reference numeral “5” in FIG. 4), a gas detector which is configured to detect the concentration of a specific gas when a fire occurs in a vehicle, or a fire detection line that outputs an electrical signal while a coating melts when it comes in contact with flame or a temperature increases to a high level.

The controller 12 can determine that a fire has occurred when the temperature detected from a signal received from the temperature sensor is a predetermined temperature or higher than the predetermined temperature, the concentration of carbon monoxide detected from a signal received from the gas detector is a set concentration or more than the set concentration, or an electrical signal is input from the fire detection line.

In an exemplary embodiment of the present disclosure, when a fire occurs in the corresponding vehicle (hereafter, referred to as a “subject vehicle”), the controller 12 is configured to perform a control process set for extinguishing a fire to be described below; that is, is configured to perform control for warning of the fire occurrence situation to the inside and outside the vehicle or warning of fire occurrence to the outside by transmitting fire occurrence information through the communication device 13 and for requesting fire extinguishment.

To the present end, the fire extinguishing system of the present disclosure may further include a warning device that warns of fire occurrence by operating in accordance with a control signal that the controller of the vehicle on fire 10 outputs after determining that a fire has occurred. The warning device may be a warning light or an alarm provided in a vehicle.

The communication device 13 of the vehicle on fire 10 is provided to communicate with external systems such as surrounding vehicles 20, the server of a fire station located outside the vehicle, etc. In an exemplary embodiment of the present disclosure, as the automotive communication device, well-known communication devices may be used without limitation in communication type as long as they enable a corresponding vehicle to communicate with the outside of the vehicle through wireless communication.

The fire extinguishing system according to an exemplary embodiment of the present disclosure further includes a fire extinguishing vehicle 20 that can supply fire extinguishing water, includes a communication device 22, and can communicate with the outside through the communication device 22. The fire extinguishing vehicle 20 is a vehicle that is, as described above, docked to the vehicle on fire 10 and then supplies fire extinguishing water, extinguishing a fire.

Figure 3:
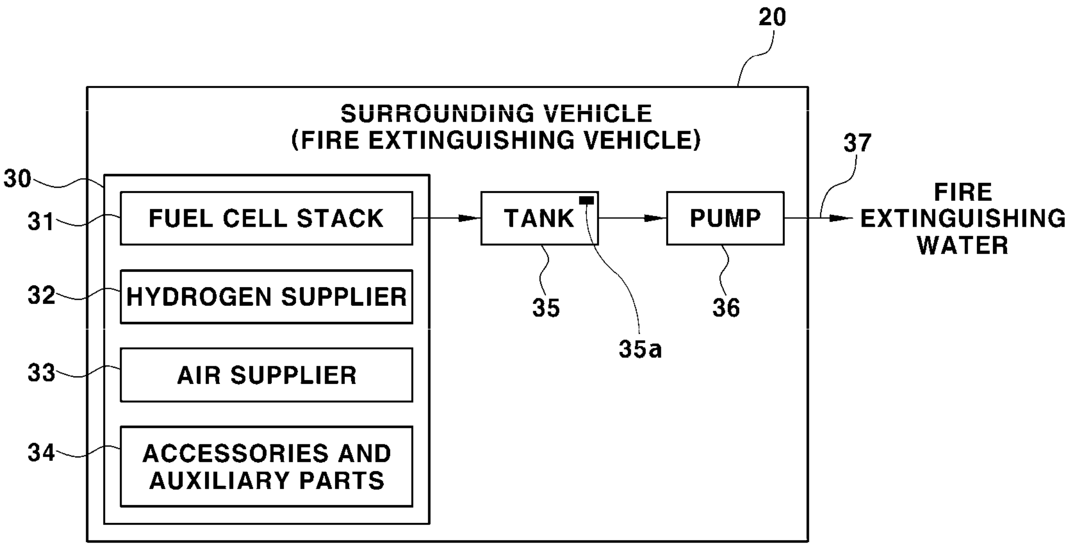
FIG. 3 is a block diagram showing the configuration, which is mounted on a fire extinguishing vehicle, in the cooperative fire extinguishing system according to an exemplary embodiment of the present disclosure.

FIG. 3 is a block diagram showing the configuration, which is mounted on the fire extinguishing vehicle 20, in the cooperative fire extinguishing system according to an exemplary embodiment of the present disclosure. A surrounding vehicle (fire extinguishing vehicle) 20 that can participate in fire extinguishment in an exemplary embodiment of the present disclosure, as described above, may be a fuel cell vehicle, in more detail, a fuel cell vehicle that can autonomously drive.

Referring to FIG. 3, a fuel cell vehicle is provided with a fuel cell system 30 and the fuel cell system 30 includes a fuel cell stack 31, a hydrogen supplier 32 that supplies hydrogen which is a fuel gas, an air supplier 33 that supplies air including oxygen which is an oxidizer gas, and other accessories and auxiliary parts 34 that are required for fuel cell driving. Common fuel cell vehicles are provided with a driving motor 26 for driving which is operated by power which is generated and supplied from the fuel cell stack 31 or power which is supplied from a battery (see FIG. 2).

The fire extinguishing vehicle 20 in an exemplary embodiment of the present disclosure is provided with a tank 35 for storing discharge water which is produced and discharged from the fuel cell stack 31, and a pump 36 that draws the discharge water stored in the tank 35 and sends the discharge water through a supply pipe 37.

In an exemplary embodiment of the present disclosure, when the fire extinguishing vehicle 20 is a fuel cell vehicle that can autonomously drive, the first extinguishing vehicle 20, as shown in FIG. 2, is provided with a common device configuration for autonomous driving, for example, an autonomous driving controller 25 that is configured to perform autonomous driving control, and an autonomous driving sensor 24 that obtains various items of information for autonomous diving control such as a camera.

In an exemplary embodiment of the present disclosure, the fire extinguishing vehicle 20 is located within a set distance around the vehicle on fire 10, receives fire occurrence information transmitted from the vehicle on fire 10 through the communication device 22, and then moves to the vehicle on fire 10, participating in fire extinguishment.

Figure 8:
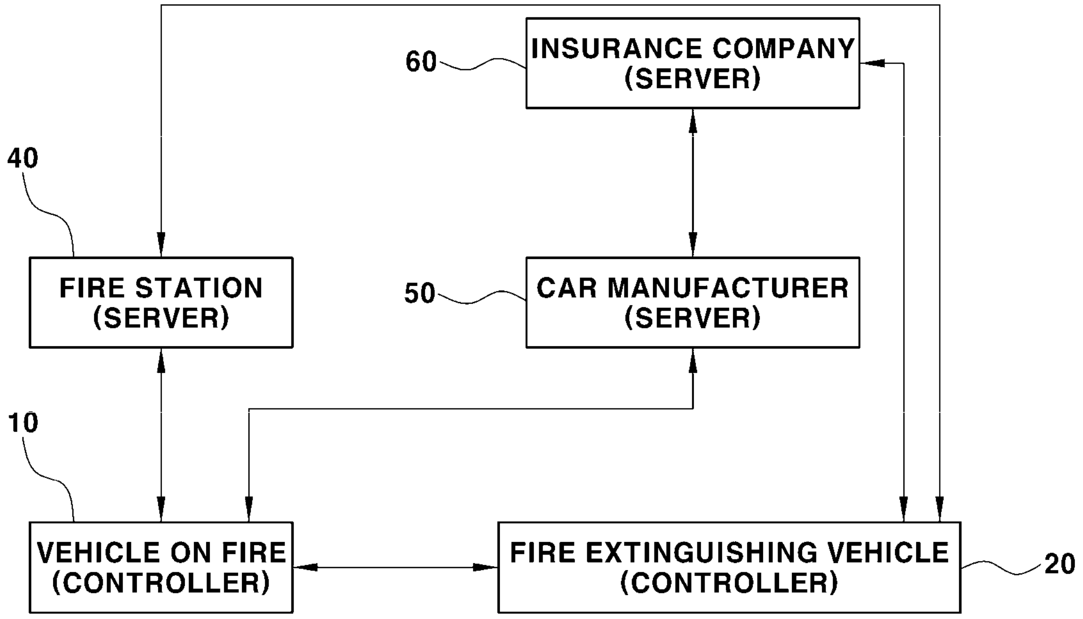
FIG. 8 is a schematic diagram showing a compensation system included in the fire extinguishing system according to an exemplary embodiment of the present disclosure.

The communication device 22 of the surrounding vehicle 20 that can participate in fire extinguishment is not different from the communication device of the vehicle on fire 10 in an exemplary embodiment of the present disclosure, and may be a wireless communication device which is mounted in the surrounding vehicle 20 to wirelessly communicate with an external system such as the vehicle on fire 10 and severs (servers indicated by reference numerals "40", "50", and "60" in FIG. 8).

It is expected that a connected car that communicates in real time with another vehicle, traffic and communication infrastructures, a pedestrian terminal, etc. will be popularized together with an autonomous vehicle, and the fire extinguishing system according to an exemplary embodiment of the present disclosure may be configured as a system that includes and utilizes such a connected art and autonomous vehicle.

In an exemplary embodiment of the present disclosure, when determining that a fire has occurred in the vehicle on fire 10 through the fire detector 11, the controller 12 of the vehicle on fire 10 transmits a fire occurrence signal, which warns of occurrence of a fire, and a fire extinguishment request signal, and fire occurrence information including the subject vehicle location, etc. through the communication device 13.

The controller 12 and the communication device 13 of the vehicle on fire 10 may be set in the instant case to transmit the fire occurrence information to all surrounding vehicles 20 located within a set radius distance (e.g., 5 km) from the subject vehicle.

Furthermore, the controller 12 and the communication device 13 of the vehicle on fire 10 may be set to transmit fire occurrence information to a closest fire station 40 from the subject vehicle location, and in the instant case, can transmit fire occurrence information including subject vehicle location information and driver information together with the fire occurrence signal that warns of occurrence of a fire. Accordingly, the fire station 40 enables a fire truck to turn out to the vehicle on fire 10 after receiving the fire occurrence information.

When the fire station 40 receives the fire occurrence information, the fire station 40 can attempt to speak to the driver over the telephone using the driver information of the vehicle on fire 10, and can send a fire truck after confirming that a fire has actually occurred through the telephone call with the driver.

In an exemplary embodiment of the present disclosure, the controller 12 of the vehicle on fire 10 checks the location of the fire station 40 and the radius distance to the fire house 40 from the current location and is configured to determine a travel time that a fire truck takes to reach the current location, using navigation information including map information and real-time traffic information.

Furthermore, the controller 12 of the vehicle on fire 10 may be set not to transmit fire occurrence information to surrounding vehicles 20 when the radius distance to the fire station 40 from the current location is within the set radius distance and the travel time that a fire truck takes to reach the current location is a set time (e.g., 15 minutes) or less.

In the instant case, a travel time to which real-time traffic information is applied may be used. The reason of not transmitting fire occurrence information to surrounding vehicles 20 when a travel time is a set time or less, as described above, is because the fire may be extinguished at the early stage by even only turning-out of a fire truck.

When the fire station 40 is located out of the set radius distance or the travel time of a fire truck exceeds the set time, the controller 12 of the vehicle on fire 10 requests fire extinguishment by transmitting fire occurrence information to surrounding vehicles 20 located within the set radius distance.

Meanwhile, in surrounding vehicles 20 that can participate in fire extinguishment, the location information of the vehicle on fire 10 is displayed on an automotive display 23, and travel times that are taken to reach the vehicle on fire 10 from current locations are determined and displayed as times to which a real-time traffic situation is applied.

Furthermore, information for asking for whether to participate in fire extinguishment and a popup window for a driver to select and input whether to participate in fire extinguishment may also be displayed on the display 23. The display 23 may be a display which is provided in a vehicle and displays navigation information including map information and location information by operating with a navigation device.

The display 23 may be also a display connected to a separate input device enabling a driver to select and input whether to participate in fire extinguishment or a touch screen type display including a configuration integrated with the input device.

As described above, a popup window through which it is possible to select and input whether to participate in fire extinguishment is displayed on the displays 23 of surrounding vehicles 20 located around the vehicle on fire 10 and receiving fire occurrence information from the vehicle on fire, and a driver can select and input whether to participate in fire extinguishment through the popup window displayed on the displays 23.

A participation selection button may be displayed in the popup window and a driver can participate in fire extinguishment by pressing the participation selection button displayed in the popup window.

When a driver selects and inputs participation in fire extinguishment in a surrounding vehicle 20 receiving the fire occurrence information, a fire extinguishment participation signal showing the intention of participating in fire extinguishment may be transmitted to the vehicle on fire 10 through the communication device 22.

The controller 12 of the vehicle on fire 10 is configured to determine the vehicle that transmitted the fire extinguishment participation signal as a fire extinguishing vehicle 20 based on the fire extinguishment participation signal received through the communication device 13. The controller 12 of the vehicle on fire 10 transmits a fire extinguishment request signal to the fire extinguishing vehicle 20 through the communication device 13.

A water level sensor 35*a* may be provided at the tank 35 that stores fire extinguishing water in the surrounding vehicle 20 that can participate in fire extinguishment, that is, the tank 35 in which discharge water is stored in a fuel cell vehicle.

The controller 21 of the surrounding vehicle 20 obtains current water level information of the discharge water in the tank 35 from a signal from the water level sensor 35*a*, and allows for selecting and inputting participation in fire extinguishment only when the obtained current water level of the discharge water in the tank 35 is a predetermined water level or more than predetermined water level.

To the present end, the controller 21 of the surrounding vehicle 20 can activate a participation selection button in the popup window displayed on the display 23 only when the current water level of the discharge water in the tank 35 is a predetermined water level or more than predetermined water level.

Furthermore, in an exemplary embodiment of the present disclosure, the controller 12 of the vehicle on fire 10 may be set to determine only a setting number of vehicles of a plurality of surrounding vehicles 20, which transmitted a fire extinguishment participation signal, as fire extinguishing vehicles in order of arrival, and can transmit a fire extinguishment request signal only to the setting number of fire extinguishing vehicles.

When fire extinguishing vehicles are selected and the number of selected fire extinguishing vehicles reaches the setting number, the vehicle on fire 10 transmits a signal showing that it is impossible to participate in fire extinguishment to the other surrounding vehicles 20 that were not determined as fire extinguishing vehicles.

The reason of limiting the number of fire extinguishing vehicles 20 to the setting number in an exemplary embodiment of the present disclosure is for preventing traffic congestion due to several vehicles that participate in fire extinguishment.

In an exemplary embodiment of the present disclosure, the controller 12 of the vehicle on fire 10 may be configured to adjust the setting number in accordance with real-time traffic situation and road situation. For example, the controller 12 of the vehicle on fire 10 can also receive and use navigation information (information which is provided from a navigation device) and can determine the setting number based on the average speed information of vehicles on surrounding roads of the navigation information.

A setting number may be set in advance for each of divided sections of the vehicle average speed, and a corresponding setting number may be determined from the vehicle average speed on surrounding roads and may be used to limit the number of fire extinguishing vehicles when a fire actually occurs. The smaller the vehicle average speed in sections, the smaller value the setting number may be set as by the controller 12.

In an exemplary embodiment of the present disclosure, when a surrounding vehicle 20 is finally set as a fire extinguishing vehicle by a driver selecting and inputting participation in fire extinguishment, autonomous driving control may be performed by an autonomous driving controller 25 so that the vehicle moves through autonomous driving to the location of a vehicle on fire 10.

When the fire extinguishing vehicle 20 reaches the location of the vehicle on fire 10, docking in which fire extinguishing water passages of both vehicles are connected is performed so that fire extinguishing water may be supplied from the fire extinguishing vehicle 20 to the vehicle on fire 10.

When a plurality of fire extinguishing vehicles 20 reaches the location of the vehicle on fire 10, the fire extinguishing vehicle 20 that has reached first is docked to be able to supply fire extinguishing water to the vehicle on fire 10, and the other fire extinguishing vehicles 20 that reached the location of the vehicle on fire 10 are controlled to stand by in an autonomous state around the vehicle on fire 10.

In an exemplary embodiment of the present disclosure, a first, as described above, may be a batter fire, in detail, a fire occurring in a battery pack.

Figure 4:
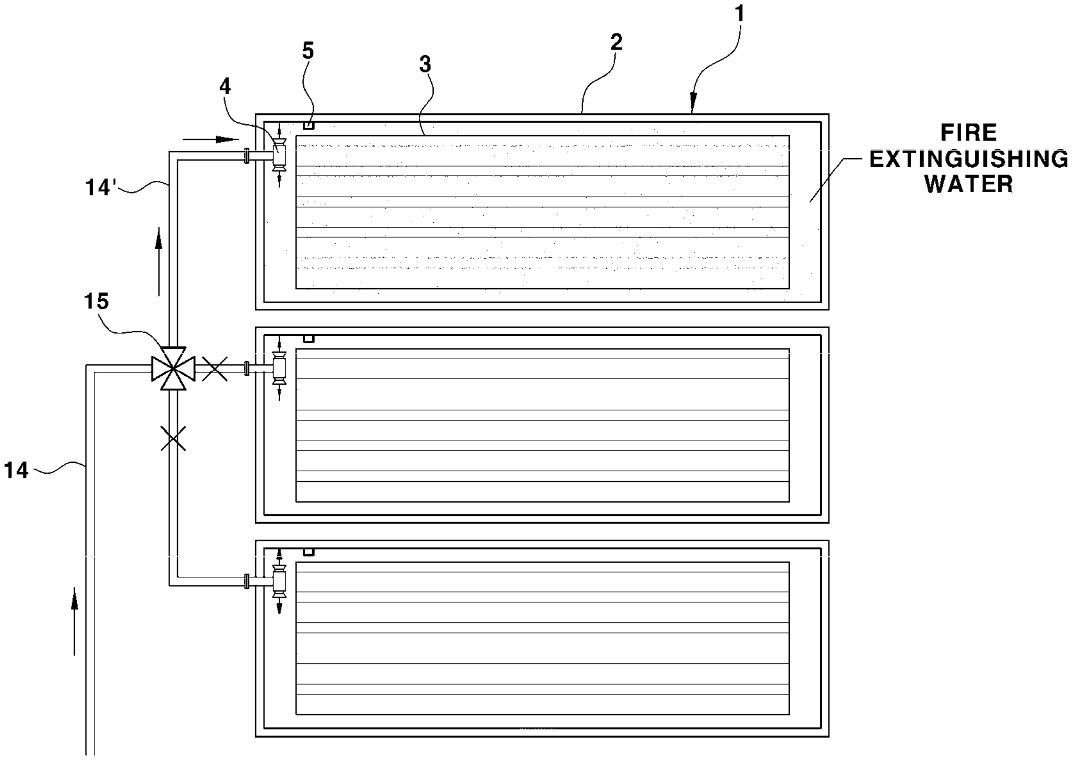
FIG. 4 is a diagram showing the main configuration, which is provided in a battery pack of a vehicle on fire, in the cooperative fire extinguishing system according to an exemplary embodiment of the present disclosure.

FIG. 4 is a diagram showing the main configuration, which is provided in a battery pack 1 of a vehicle on fire 10, in the cooperative fire extinguishing system according to an exemplary embodiment of the present disclosure. In FIG. 4, an injection pipe 14 and a nozzle 4 for supplying fire extinguishing water and a fire detector 11 are shown with the battery pack 1.

In an exemplary embodiment of the present disclosure, the battery pack 1 may include a battery case 2 and a battery module 3 disposed in the battery case 2. The battery module disposed in the battery case 2 includes a plurality of battery cells.

In an exemplary embodiment of the present disclosure, the battery case 2 includes a structure in the internal space which may be filled with fire extinguishing water, and to the present end, the internal space of the battery case 2 may be sealed with the battery module 3 therein.

That is, the battery case 2 includes a structure that surrounds and seals the battery module 3 including battery cells, so that the internal space of the battery case 2 may be filled with fire extinguishing water.

An injection pipe 14 through which fire extinguishing water is injected is connected to the battery case 1 and fire extinguishing water which is supplied from a docked fire extinguishing vehicle 20 is supplied into the internal space of the battery case 2 through the injection pipe 14, whereby a fire occurring at the battery module 3 is extinguished.

As described above, in an exemplary embodiment of the present disclosure, it is possible to extinguish a fire occurring in the internal space of the battery case 2 surrounding the battery module 3, and it is possible to extinguish a fire in the manner of filling the internal space of the battery case 2 with fire extinguishing water by supplying fire extinguishing water. The fire extinguishing water supplied in the internal space of the battery case 2 maintains the battery cells in a cooled state, preventing re-firing or thermal runway at the battery cells.

As shown in FIG. 4, a plurality of battery packs 1 may be mounted in a vehicle, and in the instant case, an injection pipe 14 connected to a supply pipe 37 of a fire extinguishing vehicle 20 diverges to the battery packs 1 at the downstream side of a flow control valve 15 with a battery fire extinguishment nozzle 4 provided in each of the battery packs 1, and the diverging injection pipes 14' are connected to the battery fire extinguishment nozzle 4 of the battery packs 1, respectively.

Accordingly, the controller 12 of a vehicle on fire 10 is configured to determine a battery pack 1 with a fire based on a signal from a fire detector (which is indicated by reference numeral "11" in FIG. 2 and is the temperature sensor indicated by reference numeral "5" in FIG. 4), and is configured to control the open state of the flow control valve 15 so that the injection pipe connected to the battery pack with a fire of the diverging injection pipes 14' is opened.

Next, when fire extinguishing water is supplied through the injection pipe 14 from the first extinguishing vehicle 20 docked to the vehicle on fire 10, the fire extinguishing water may be injected to fill the internal space of the battery case 2 through the nozzle 4 in the battery pack 1 with a fire.

Reference numeral "5" indicates a temperature sensor in FIG. 4 and the temperature sensor 5 is a fire detector which is configured to detect a fire that occurs in the battery pack 1. As described above, the fire detector (indicated by reference numeral "11" in FIG. 2) which is configured to detect a fire in the battery pack 1 may be a temperature sensor 5.

Meanwhile, in an exemplary embodiment of the present disclosure, surrounding vehicles 20 wirelessly receive fire occurrence information transmitted from a vehicle on fire 10, and fire extinguishing vehicles 20 selected from the surrounding vehicles receiving the fire occurrence information are moved to the location of the vehicle on fire 10 and participate in fire extinguishment.

In the instant case, a plurality of fire extinguishing vehicles 20 can participate in fire extinguishment while transmitting and receiving necessary information by communicating with the vehicle on fire 10, and the plurality of fire extinguishing vehicles 20 arriving for in fire extinguishment can sequentially dock to the vehicle on fire 20 and can supply fire extinguishing water.

That is, the first arriving fire extinguishing vehicle 20 docks to the vehicle on fire 10 and supplies fire extinguishing water, and then when the stored fire extinguishing water is fully supplied, the fire extinguishing vehicle 20 stops operation of the pump 36 and then may be automatically separated from the vehicle on fire. Thereafter, the next fire extinguishing vehicle 20 docks to the vehicle on fire 10 and then supplies fire extinguishing water.

In the instant case, the order of docking to the vehicle on fire 10 and supplying fire extinguishing water may be determined as the order of reaching the location of the vehicle on fire 10, and fire extinguishing vehicles 20 dock to the vehicle on fire 10 and then supply fire extinguishing water in order of arrival, extinguishing the fire.

Furthermore, the controller 12 of the vehicle on fire 10 wirelessly requests fire extinguishing vehicles 20 standing by around the vehicle on fire to move to a safe place not to interfere with entry of a fire truck through the controllers 12 of the fire extinguishing vehicles 20 until a setting time (e.g., 2~3 minutes) before the fire truck arrives, so that the fire extinguishing vehicles 20 standing by around the vehicle on fire 10 can move to a safe place in accordance with the request from the vehicle on fire 10. In the instant case, the autonomous driving controllers 25 of the fire extinguishing vehicles 20 standing by perform autonomous driving control to move subject vehicles to a safe place.

Alternatively, the controllers 21 of the fire extinguishing vehicles 20 standing by can receive in real time the location of a fire truck that has turned out from a fire station 40, and similarly, the autonomous driving controllers 25 of the fire extinguishing vehicles 20 perform autonomous driving control to move subject vehicles to a safe place until a setting time (e.g., 2~3 minutes) before the fire truck arrives.

When a fire truck reaches the site, a firefighter separates the supply pipe 37 of a fire extinguishing vehicle 20 from the vehicle on fire 10 and connects a fire hose of the fire truck to be able to supply fire extinguishing water to the vehicle on fire 10, whereby fire extinguishing water stored in the tank of the fire truck is supplied to the vehicle on fire 10 and extinguishes the fire.

In an exemplary embodiment of the present disclosure, a fire extinguishing vehicle 20 may be moved in an autonomous driving mode during some or the entire of the processes described above such as the process in which a fire extinguishing vehicle 20 is moved to the location of the vehicle on fire 10, the process of moving to a docking position to dock to the vehicle on fire 10, the process of docking to the vehicle on fire, and the process in which the fire extinguishing vehicle stands by after reaching the location of the vehicle on fire 10 and then moves to a safety place right before a fire truck arrives.

Of course, when an autonomous driving mode is impossible, a fire extinguishing vehicle 20 may be driven and moved in a manual mode with the autonomous driving mode inactivated in accordance with determination of a driver. The present process may also be applied to some or the entire of the processes for fire extinguishment according to an exemplary embodiment of the present disclosure.

For example, the controller 12 of a vehicle on fire 10 can transmit information related to an internal temperature of a battery pack 1 detected by the temperature sensor 5 to a fire extinguishing vehicle 20 through the communication device 13.

In the instant case, the controller 21 of the fire extinguishing vehicle 20 inactivates the autonomous driving mode by communicating with the autonomous driving controller 25 when the internal temperature of the battery pack 1 received through the communication device 22 is a setting temperature (e.g., 200° C.) or more than the setting temperature.

Next, the driver of the fire extinguishing vehicle 20 is guided through the display 23, etc. to move the vehicle to a safe place in a manual mode. As described above, when the internal temperature of the battery pack 1 in the vehicle on fire is a setting temperature, for example, 200° C. or more that setting temperature, it means that thermal runway has occurred in the battery pack, so it is impossible to extinguish a fire of the battery pack. Accordingly, the fire extinguishing vehicle 20 is guided to move a safe place in a manual mode.

In the instant case, a flap 14*b* and the flow control valve 15 are closed in the vehicle on fire 10, preventing spread of the fire of the battery pack 1.

Hereafter, the process of docking a fire extinguishing vehicle to a vehicle on fire to be able to supply fire extinguishing water in the firing extinguishing system according to an exemplary embodiment of the present disclosure is described.

When a fire extinguishing vehicle 20 reaches the location of a vehicle on fire 10 in an autonomous driving mode, the autonomous driving controller 25 of the fire extinguishing vehicle 20 requests the vehicle kind and the docking position information from the vehicle on fire 10 and wirelessly receives the vehicle kind and the docking position information from the controller 12 of the vehicle on fire 10.

The docking position information may include position information of a docking connector 14*c* of the vehicle on fire 10 to which the supply pipe 37 of the fire extinguishing vehicle 20 is connected. The docking connector 14*c*, which is a connector provided at the end portion of the injection pipe 14 of the vehicle on fire 10, is a connector to which the supply pipe 37 of the fire extinguishing vehicle 20 is coupled to be able to supply fire extinguishing water.

Next, the autonomous driving controller 25 of the fire extinguishing vehicle 20 is configured to perform autonomous driving control that is configured to control operation of the steering system and the driving motor 26 of the vehicle so that the fire extinguishing vehicle 20 may be moved to the docking position based on image information obtained by a camera of the autonomous driving sensor 24 together with the received vehicle kind and docking position information.

The autonomous driving controller 25 of the fire extinguishing vehicle 20 moves the fire extinguishing vehicle to the accurately docking position using the vehicle kind and docking position information of the vehicle on fire 10.

Furthermore, the autonomous driving controller 25 of the fire extinguishing vehicle 20 precisely controls the position and the movement state of the subject vehicle in an autonomous driving mode so that the supply pipe 37 of the subject vehicle may be connected to the connector 14*c* at the injection pipe 14 of the vehicle on fire 10.

Figure 5:
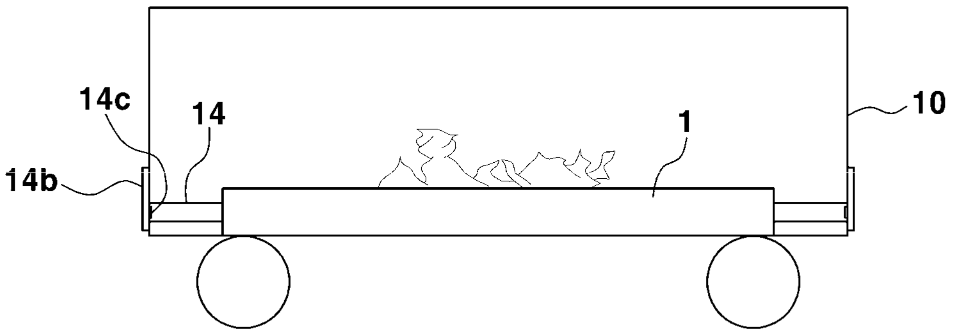
FIG. 5, FIG. 6 and FIG. 7 are views showing an example of docking a fire extinguishing vehicle to a vehicle on fire in an exemplary embodiment of the present disclosure.
Figure 6:
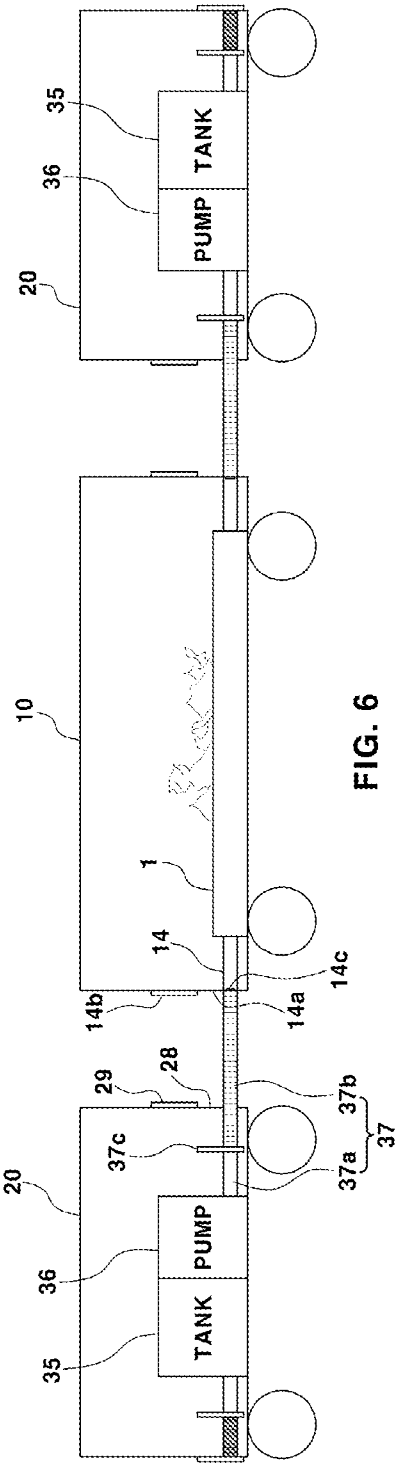
Figure 7:
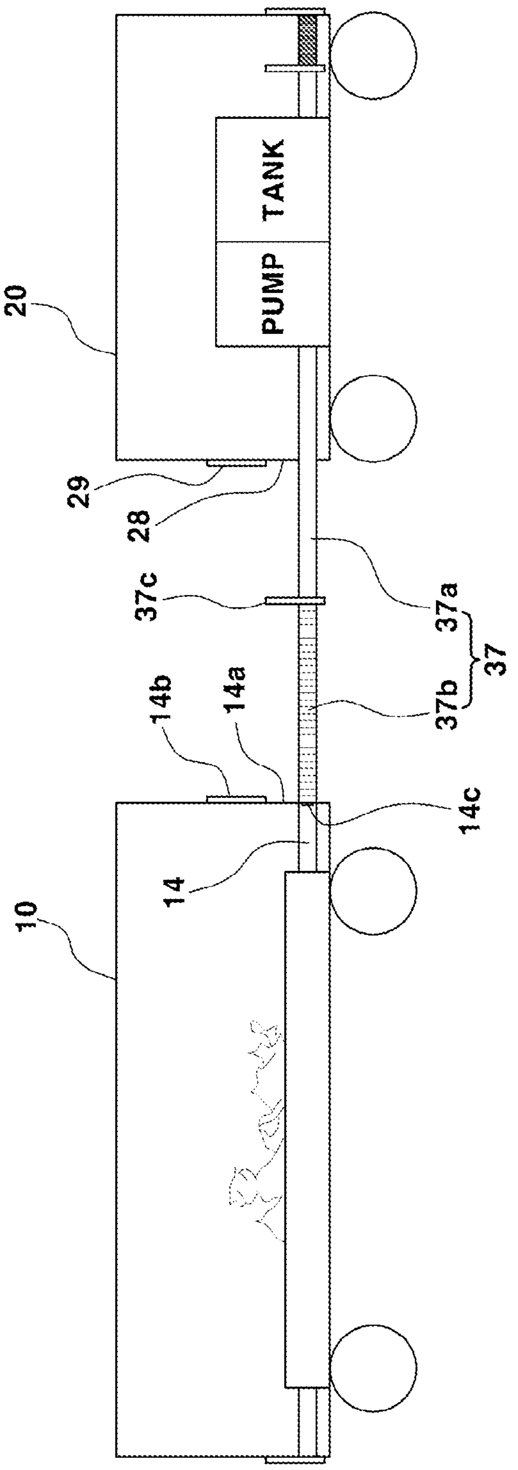

FIG. 5, FIG. 6 and FIG. 7 are diagrams showing an example in which a fire extinguishing vehicle 20 is docked to a vehicle on fire 10 in an exemplary embodiment of the present disclosure, in which a plurality of injection pipes 14 may be connected to a battery pack 1 in the vehicle on fire 10.

A connector 14*c* of the injection pipes 14 is disposed at an opening 14*a* formed at a side of the vehicle body of the vehicle on fire 10, and the injection pipes 14 are connected to the battery case 2 of the battery pack 1 so that fire extinguishing water may be supplied.

Furthermore, a flap 14*b* that opens or closes the opening 14*a* at which the connector 14*c* of the injection pipes 14 is provided. The flap 14*b* may be operated for opening and closing by an actuator such as a motor. The operation of the actuator is controlled by the controller 12 of the vehicle on fire 10, and the controller 12 of the vehicle on fire 10 opens the flap 14*b* by controlling the operation of the actuator when determining that a fire has occurred in the subject vehicle.

The flap may be provided in the fire extinguishing vehicle 20, and similarly, a flap 29 may be provided to open or close an opening 28 through which the supply pipe 37 can pass on the vehicle body of the fire extinguishing vehicle 20. The flap 29 may also be operated for opening and closing by an actuator such as a motor. The operation of the actuator is controlled by the controller 21 of the fire extinguishing vehicle 20 and the controller 21 of the fire extinguishing vehicle 20 opens the flap 29 by controlling the operation of the actuator at the point in time of docking.

Furthermore, the supply pipe 37 of the fire extinguishing vehicle 20 is provided to be connected to the tank 35 in which discharge water produced and discharged from the fuel cell stack 31 is stored, as described above. The supply pipe 37 includes a flexible hose 37*a* connected to the outlet of the pump 36 that draws and discharges the discharge water stored in the tank 35, and an extension pipe 37*b* including a configuration connected to the flexible hose 37*a* through a connecting member 37*c* and being able to be longitudinally stretched.

The flexible hose 37*a* is shown to include a small length in FIG. 6, but the actual flexible hose 37*a* includes a predetermined large length and may be accommodated inside the vehicle body of the fire extinguishing vehicle 20. Accordingly, as shown in FIG. 7, when the fire extinguishing vehicle 20 is moved with the extension pipe 37*b* of the fire extinguishing vehicle 20 connected to the injection pipe 14 of the vehicle on fire 10 through the connector 14*c*, the flexible hose 37*a* can be stretched to extend far out of the vehicle body of the fire extinguishing vehicle 20.

The extension pipe 37*b* may be a pipe including a multi-stage structure of overlapping hard pipes and can horizontally stretch out of the vehicle body through the opening 28 of the vehicle body when the flap 29 of the fire extinguishing vehicle 20 is opened. The horizontally stretching extension pipe 37*b* is connected to the injection pipe 14 of the vehicle on fire 10 through the connector 14*c* to supply fire extinguishing water.

The connecting member 37*c* is detachably provided inside the vehicle body of the fire extinguishing vehicle 20, and to the present end, the connecting member 37*c* is coupled to the internal surface of the vehicle body by a locking device including an actuator.

The locking device is unlocked by the controller 21 or the autonomous driving controller 25 of the fire extinguishing vehicle 20, and when the locking device is unlocked, the connecting member 37*c* may be detached and separated from the internal surface of the vehicle body of the fire extinguishing vehicle 20.

When the connecting member 37*c* is detached and separated from the internal surface of the vehicle body, the flexible hose 37*a* connected to the outlet of the pump 36 may be drawn out to be long from the vehicle through the opening 28 together with the connecting member 37*c*.

FIG. 6 shows an example in which two fire extinguishing vehicles 20 have been simultaneously docked to a vehicle on fire 10. The two fire extinguishing vehicles 20 are simultaneously docked to the vehicle on fire 10 with the flaps 14*b* and 28 of the vehicles at both sides open, whereby fire extinguishing water may be supplied.

FIG. 7 shows an example in which a fire extinguishing vehicle 20 has been docked to a vehicle on fire 10 and has moved away from the vehicle on fire.

As shown in the figure, when a fire extinguishing vehicle 20 is docked to a vehicle on fire 10, the extension pipe 37*b* of the fire extinguishing vehicle 20 is connected to the injection pipe 14 of the vehicle on fire 10 through the connector 14*c*, and in the instant state, the fire extinguishing vehicle 20 may be moved away from the vehicle on fire 10 to secure a safety distance.

In the present process, the connecting member 37*c* coupled to the internal surface of the vehicle body of the fire extinguishing vehicle 20 is separated and the flexible hose 37*a* of the supply pipe 37 of the fire extinguishing vehicle 20 may be stretched and extended out of the fire extinguishing vehicle 20 through the opening 28.

Accordingly, the fire extinguishing vehicle 20 may be moved away from the vehicle on fire 10 and fire extinguishing water may be supplied to the vehicle on fire 10 through the supply pipe 37 from the fire extinguishing vehicle 20 with a safety distance secured.

When a fire truck arrives, the flexible hose 37*a* is separated from the extension pipe 37*b* connected to the injection pipe 14 of the vehicle on fire 10 by manipulating the connecting member 37*c* between the flexible hose 37*a* and the extension pipe 37*b* and a fire hose of the fire truck is connected to the extension pipe 37*b* so that fire extinguishing water in the tank of the fire truck is supplied into the vehicle on fire 10 (into a battery pack) through the extension pipe 37*b* and the injection pipe 14.

The fire extinguishing system according to an exemplary embodiment of the present disclosure further includes a compensation system configured to economically compensate to drivers of vehicles participating in fire extinguishment.

FIG. 8 is a schematic diagram showing a compensation system included in the fire extinguishing system according to an exemplary embodiment of the present disclosure, in which a server of a fire station 40, a sever or a vehicle manufacturer 50, the controller of a vehicle on fire 10, and a controller of a fire extinguishing vehicle 20 are shown.

When a surrounding vehicle 20 located within a set radius distance from a vehicle on fire 10 receives firing occurrence information and then the driver of the surrounding vehicle 20 selects and inputs participation in fire extinguishment, the surrounding vehicle 20 may be selected as a fire extinguishing vehicle 20 and economic compensation may be provided for the selected fire extinguishing vehicle 20 through a compensation system.

The compensation system may be operated by a service provider 50 and an insurance company 60 through cooperation. The compensation system includes a server of the service provider 50 and a server of the insurance company 60.

The server of the service provider 50 and the server of the insurance company 60 are servers connected so that communication is possible through the internet or other wired and wireless communication network, and the compensation system provides a compensation service that provides economic benefit such as a point, a coupon, cash, a discount of a premium, etc. To the driver of the fire extinguishing vehicle 20 connected to the servers after participation in fire extinguishment.

The driver of the vehicle on fire 10 joins the service provider 50 in advance to easily receive help in fire extinguishment from another vehicle in preparation for a case of a fire, and the driving joining the membership is supported with a fire extinguishment service when a fire actually occurs in his or her vehicle.

In an exemplary embodiment of the present disclosure, the service provider 50 may be a vehicle manufacturer that manufactured the vehicle on fire 10 and the insurance company 60 may be an insurance company that operates the vehicle insurance that the driver of the vehicle on fire 10 subscribed.

Referring to FIG. 8, the server of the fire station 40 is configured to perform a general process for sending a fire truck after receiving fire occurrence information from the controller of the vehicle on fire 10 and transmits the location of a fire truck in real time to the fire extinguishing vehicle 20 while the fire truck moves to the location of the vehicle on fire 10.

Accordingly, the fire extinguishing vehicle 20 that recognizes the location of the fire truck can move to a safety place from the vehicle on fire 10 until a setting time before the turning-out fire truck reaches the site. In the instant case, not only standing-by fire extinguishing vehicles 20, but the fire extinguishing vehicle 20 connected to supply fire extinguishing water to the vehicle on fire may be separated and moved.

The server of the service provider (car manufacturer) 50 of the components of the compensation system receives whether a fire has occurred and the general vehicle state information from the vehicle (vehicle on fire) of the driver who subscribed a service, so that the service provider 50 finds out the reason of the fire by analyzing the received vehicle state information.

The service provider 50 can receive information related to a fire in a vehicle such as whether a fire has been extinguished, a fire extinguishment time, and fire state information from the vehicle on fire and can use the information later in big data analysis for vehicle fires. The fire state information may be the internal temperature of the battery pack 1 detected by the temperature sensor 5, the concentration of gas such as carbon monoxide detected by a gas detector, etc.

The server of the service provider 50 can receive docking information from the fire extinguishing vehicle 20 to be able to whether the vehicle participated in fire extinguishment, and the fire extinguishing vehicle 20 transmits docking information to the server of the service provider 50 only when the fire extinguishing vehicle 10 actually docked to the vehicle on fire 10 and supplied fire extinguishing water.

Accordingly, the service provider 50 can check whether the fire extinguishing vehicle 20 actually participated in the fire extinguishment based on the docking information received through the server, and the server of the service provider 50 can transmit information such as the number of cases of participating in fire extinguishment of only drivers who agreed before to the server of the insurance company 60.

The service provider 50 can provide a compensation service that provides a point, a coupon, cash, or the like to the driver of the fire extinguishing vehicle 20 by checking whether the vehicle participated in fire extinguishment, and the insurance company 60 can provide a compensation service such as a discount of a premium corresponding to the number of cases of participating in fire extinguishment to a corresponding driver by checking the number of cases of participating in fire extinguishment of each vehicle.

The server of the service provider 50 can receive information, such as the supply amount of fire extinguishing water obtained from a signal of the water level sensor **35*a* in the tank 35 of the fire extinguishing vehicle 20, whether the fire extinguishing vehicle 20 participated in fire extinguishment, and the gas backflow amount detected by a gas detector provided in the fire extinguishing vehicle 20, from the fire extinguishing vehicle 20, and the service provider 50** can use the information later in big data analysis for vehicle fires.

Furthermore, the term related to a control device such as “controller”, “control apparatus”, “control unit”, “control device”, “control module”, or “server”, etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A cooperative fire extinguishing system for a vehicle, the cooperative fire extinguishing system comprising:

a fire detector detecting a fire in the vehicle;

a controller of the vehicle on fire, wherein a processor of the controller of the vehicle on fire transmits fire occurrence information including a fire extinguishment request signal and location information of the vehicle to a surrounding vehicle and performs a control process for fire extinguishment of the vehicle on fire upon concluding that the fire has occurred through the fire detector;

a controller of the surrounding vehicle, wherein a processor of the controller of the surrounding vehicle receives the fire occurrence information from the controller of the vehicle on fire, transmits a signal showing whether to participate in the fire extinguishment determined by a driver of the surrounding vehicle to the vehicle on fire, and performs cooperative control for supplying fire extinguishing water of the surrounding vehicle to the vehicle on fire together with the controller of the vehicle on fire in response that the participation in the fire extinguishment is determined; and a tank mounted in the surrounding vehicle and storing the fire extinguishing water which is supplied to the vehicle on fire.

2. The cooperative fire extinguishing system of claim 1, further including a pump mounted in the surrounding vehicle and drawing and sending the fire extinguishing water stored in the tank to the vehicle on fire through a supply pipe so that the fire extinguishing water is supplied to the vehicle on fire.

3. The cooperative fire extinguishing system of claim 1, wherein the surrounding vehicle is an autonomous vehicle and is provided with:

an autonomous driving sensor obtaining information for autonomous driving control of the surrounding vehicle; and an autonomous driving controller controlling an autonomous driving of the surrounding vehicle based on the information obtained by the autonomous driving sensor, wherein the autonomous driving controller performs the autonomous driving control to move the surrounding vehicle to a docking position, so that a supply pipe of the surrounding vehicle connected to the tank to supply the fire extinguishing water is connected to an injection pipe of the vehicle on fire, based on the information obtained by the autonomous driving sensor.

4. The cooperative fire extinguishing system of claim 3, wherein the controller of the vehicle on fire transmits the fire occurrence information including a fire occurrence signal and the location information of the vehicle on fire to a fire station through a communication device of the vehicle on fire for a fire truck to be dispatched from the fire station.

5. The cooperative fire extinguishing system of claim 3, wherein the autonomous driving controller requests a vehicle kind of the vehicle on fire and docking position information from the vehicle on fire, and performs the autonomous driving control to move the surrounding vehicle to the docking position based on the vehicle kind and the docking position information received from the controller of the vehicle on fire when the surrounding vehicle reaches a location of the vehicle on fire in an autonomous driving mode of the surrounding vehicle.

6. The cooperative fire extinguishing system of claim 5, wherein the docking position information includes position information of a docking connector of the vehicle on fire to which the supply pipe of the surrounding vehicle is connected.

7. The cooperative fire extinguishing system of claim 1, further including a docking connector which is disposed in the vehicle on fire and to which a supply pipe of the surrounding vehicle supplying the fire extinguishing water stored in the tank is connected to supply the fire extinguishing water for the fire extinguishment.

8. The cooperative fire extinguishing system of claim 1, wherein the surrounding vehicle is a fuel cell vehicle, and wherein the tank mounted in the surrounding vehicle is a tank storing discharge water produced and discharged from a fuel cell stack.

9. The cooperative fire extinguishing system of claim 1, wherein the controller of the vehicle on fire transmits the fire occurrence information to surrounding vehicles located within a predetermined radius distance from the vehicle on fire though a communication device of the vehicle on fire.

10. The cooperative fire extinguishing system of claim 9, wherein the controller of the vehicle on fire transmits the fire occurrence information including a fire occurrence signal and the location information of the vehicle on fire to a fire station through the communication device of the vehicle on fire for a fire truck of the fire station to be dispatched from the fire station.

11. The cooperative fire extinguishing system of claim 10, wherein the controller of the vehicle on fire:

determines a radius distance to the fire station from a location of the vehicle on fire and a travel time that the fire truck takes to reach the location of the vehicle on fire from the fire station, using navigation information including map information and real-time traffic information, and does not transmit the fire occurrence information to the surrounding vehicles when the radius distance to the fire station is within the predetermined radius distance from the location of the vehicle on fire and the travel time is within a predetermined time.

12. The cooperative fire extinguishing system of claim 10, wherein the controller of the vehicle on fire:

receives a location of the fire truck turned out from the fire station through the communication device of the vehicle on fire, and requests surrounding vehicles that reached the location of the vehicle on fire for the firing extinguishment to move to other places until a predetermined time before the turning-out fire truck reaches the location of the vehicle on fire.

13. The cooperative fire extinguishing system of claim 1, further including:

an input device mounted in the surrounding vehicle and inputting whether to participate in the fire extinguishment to the controller of the surrounding vehicle in response that the driver of the surrounding vehicle selects whether to participate in the fire extinguishment.

14. The cooperative fire extinguishing system of claim 13, further including:

a display mounted in the surrounding vehicle and controlled by the controller of the surrounding vehicle to display the location information of the vehicle on fire, a travel time of the surrounding vehicle, which is taken to reach a location of the vehicle on fire, and information for asking whether to participate in the fire extinguishment.

15. The cooperative fire extinguishing system of claim 13, wherein in response that the driver of the surrounding vehicle selects and inputs participation in the fire extinguishment through the input device, the controller of the surrounding vehicle transmits a fire extinguishment participation signal showing intention of participating in the fire extinguishment to the vehicle on fire through a communication device of the surrounding vehicle, and when receiving the fire extinguishment participation signal through the communication device of the vehicle on fire, the controller of the vehicle on fire selects the surrounding vehicle that transmitted the fire extinguishment participation signal as a fire extinguishing vehicle, and performs cooperative control for the fire extinguishment together with the controller of the surrounding vehicle selected as the fire extinguishing vehicle.

16. The cooperative fire extinguishing system of claim 15, wherein the controller of the vehicle on fire:

transmits the fire occurrence information to surrounding vehicles located within a predetermined radius distance from the vehicle on fire through the communication device of the vehicle on fire, and selects a setting number among the surrounding vehicles that transmitted the fire extinguishment participation signal as fire extinguishing vehicles in order of arrival of the fire extinguishment participation signal.

17. The cooperative fire extinguishing system of claim 16, wherein controllers of the selected fire extinguishing vehicles and the controller of the vehicle on fire perform cooperative control for connecting the selected fire extinguishing vehicles to supply fire extinguishing water of the selected fire extinguishing vehicles to the vehicle on fire in the order and for separating and moving a connected fire extinguishing vehicle from the vehicle on fire when the connected fire extinguishing vehicle supplied at least predetermined amount of fire extinguishing water in a tank of the connected fire extinguishing vehicle to the vehicle on fire.

18. The cooperative fire extinguishing system of claim 1, further including:

a compensation system performing economical compensation to drivers of surrounding vehicles that participated in the fire extinguishment for the vehicle on fire, wherein the compensation system includes a server of a service provider the server includes a processor providing a compensation service to the drivers of the surrounding vehicles participated in the fire extinguishment, and wherein the server of the service provider provides the compensation service that provides at least one of a point, a coupon, and cash to the drivers of the surrounding vehicles that participated in the fire extinguishment.

19. The cooperative fire extinguishing system of claim 1, further including:

a compensation system performs economical compensation to drivers of surrounding vehicles that participated in the fire extinguishment for the vehicle on fire, wherein the compensation system includes:

a server of a service provider provides a compensation service to the drivers of the surrounding vehicles that participated in the fire extinguishment; and a server of an insurance company connected to the server of the service provider so that communication is possible therebetween, and having insurance that the drivers of the surrounding vehicles subscribed, and wherein the server of the service provider and the server of the insurance company provide a compensation service that gives benefit of a discount of a premium to the drivers of the surrounding vehicles that participated in the fire extinguishment.

20. The cooperative fire extinguishing system of claim 1, wherein the fire of the vehicle is a fire that has occurred in an internal space of a battery case of a battery pack mounted in the vehicle on fire, and wherein the battery case includes a structure sealing a battery module including battery cells so that the internal space in which the battery module is positioned is filled with the fire extinguishing water supplied from the surrounding vehicle and injected through an injection pipe of the vehicle on fire.

* * * * *